United States Patent [19]
Kaye

[11] Patent Number: 4,565,175
[45] Date of Patent: Jan. 21, 1986

[54] ENGINE COOLING SYSTEM

[75] Inventor: George C. Kaye, Broadstone, England

[73] Assignee: Sabre Engines Limited, Dorset, England

[21] Appl. No.: 611,893

[22] Filed: May 18, 1984

[30] Foreign Application Priority Data

May 19, 1983 [GB] United Kingdom ............... 8313907

[51] Int. Cl.$^4$ ............................................. F00M 31/00
[52] U.S. Cl. ................................. 123/542; 123/41.29; 123/41.31
[58] Field of Search ................. 123/41.1, 41.29, 41.31, 123/41.33, 540, 541, 542

[56] References Cited

U.S. PATENT DOCUMENTS

| | | | |
|---|---|---|---|
| 2,063,436 | 12/1936 | Hild | 123/41.29 |
| 2,070,092 | 2/1937 | Ramsaur | 123/41.29 |
| 2,365,166 | 12/1944 | Bay | 123/41.29 |
| 2,417,237 | 3/1947 | Chandler | 123/41.29 |
| 3,134,371 | 5/1964 | Crooks | 123/41.31 |

Primary Examiner—Ronald H. Lazarus
Attorney, Agent, or Firm—Lee, Smith & Zickert

[57] ABSTRACT

A diesel engine (2) having a charge air cooler (34) is liquid cooled and employs a single heat exchanger (28) for cooling the coolant for both the cylinder block (4) and the charge air cooler (34). The engine block (4) is connected in a first cooling circuit which includes a pump (8) and a thermostatic valve (12), while the charge air cooler 34 is connected in a second circuit including the heat exchanger (28) and pump (30). When the coolant in the first circuit is below the operating temperature, the two circuits operate independently. When operating temperature is reached, the valve (12) opens to bring the two circuits partly in series, with the second circuit between the heat exchanger (28) and the first circuit at the downstream side of the heat exchanger, so that the charge air cooler (34) operates at a lower temperature than the engine cylinder block (4).

2 Claims, 1 Drawing Figure

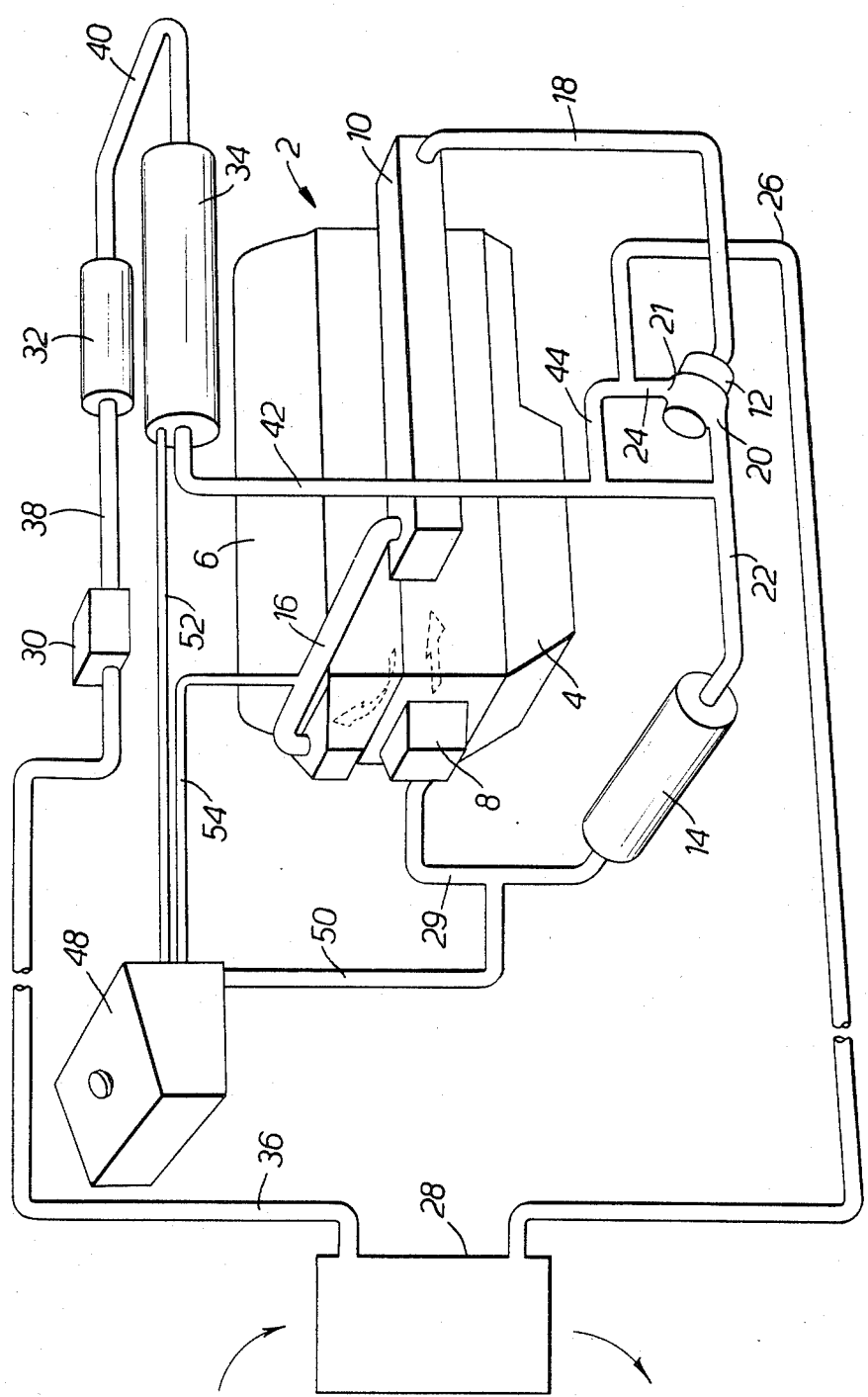

ENGINE COOLING SYSTEM

This invention relates to a cooling system for a diesel engine having charge air cooling.

It is common practice in this type of engine for marine use to provide two cooling circuits, one circuit for cooling the so-called charge air, i.e. the air which is pressure charged into the engine cylinder prior to injection of the fuel, and a second circuit for cooling the engine block and cylinder head. These cooling circuits operate at different temperatures, the lower temperature of the first circuit effecting efficient charge air cooling, and the thermostatically controlled higher temperature of the other circuit being correct for the temperature requirements of the cylinder jacket. The coolant medium—water—from each of these cooling circuits is cooled by means of separate heat exchange units, or remote coolers, well-known in themselves, and it will suffice to say that they may be of the type known as a keel cooler, a skin cooler, or a shell and tube cooler, each utilising so-called "raw" water i.e. sea, river, or lake water as the coolant for the heat exchanger. The keel cooler arrangement involves the locating of the pipes through which the charge air coolant medium or the engine coolant medium passes, on the outer surface of the keel so that heat from the coolant is dissipated by the passage of the "raw" water over the pipes. This arrangement causes increased hydrodynamic drag and risk of accidental damage due to its location and is not desirable in some cases. The skin cooler is somewhat similar in principle to a keel cooler, being a chamber located on the inside of the skin of the hull so that the heat of the coolant transfers through the hull into the "raw" water. Furthermore, the need for two coolers results in increased cose and complexity both in manufacture, fitting and maintenance.

The use of a shell and tube type of remote cooler can avoid some of the problems of hydrodynamic drag, as such a cooler can be fitted within the hull of a vessel and supplied with "raw" water, e.g. from a marine jet propulsion system, in such a way that the "raw" water can drain through a permanent bleed pipe in the bottom of the hull when the vessel is lifted out of the water.

In the present invention, a cooling system of a charge air cooled diesel engine comprises a first, engine cylinder block, cooling circuit and a second, charge air cooling, circuit each employing a liquid coolant. The cooling system is characterised in having means for connecting the two circuits in series with one another and with a single heat exchanger for cooling coolant passing therethrough, with the second circuit downstream of the heat exchanger and upstream of the first circuit.

Preferably, the connecting means are temperature controlled in such manner that the two circuits operate independently until the temperature of the coolant in the first circuit reaches a given value.

The single FIGURE of the accompanying drawings shows, diagrammatically, the cooling circuits in a pressure-charged, charge air cooled, marine desel engine according to one embodiment of the invention.

As seen in the drawing an engine 2 comprising an engine block 4 and a cylinder head 6 has a cooling circuit including a water pump 8, an exhaust manifold water jacket 10, a thermostat valve 12, and an engine oil cooler 14. A pipe 16 connects the cylinder head 6 to the exhaust manifold water jacket 10, and a pipe 18 connects the water jacket 10 with the thermostat valve 12. This valve has two outlets; one outlet 20 connects with a pipe 22 leading to the engine oil cooler 14, while the other outlet 21 leads via a short pipe 24 to a further pipe 26 which in turn leads to a heat exchanger 28 for cooling the coolant medium of the cooling circuits. A further pipe 29 connects the engine oil cooler 14 to the pump 8. The temperature of the water in the engine cooling circuit is controlled by thermostat valve 12 in well-known manner.

Also seen in the drawing is a lower temperature charge air cooler circuit comprising a pump 30 driven by the engine 2, a gearbox oil cooler 32 and a charge air cooler 34. A pipe 36 connects the heat exchanger 28 to the pump 30, a pipe 38 connects the pump to the gearbox oil cooler 32, and a further pipe 40 connects the gearbox oil cooler 32 to the charge air cooler 34. From the charge air cooler passes a pipe 42 leading to the pipe 22, and a branch pipe 44 leads from pipe 42 to the pipe 26.

A header tank 48 is connected by a pipe 50 to pipe 29, and bleed pipes 52, 54 lead to the header tank from the charge air cooler 34 and the pipe 16 respectively. By this means water is continously bled from the high temperature circuit and the low temperature circuit to the header tank where it is de-aerated, the water thus lost being returned to the high temperature circuit via pipe 50.

The heat exchanger 28 is, in the present example, of the shell and tube type, well-known in the industry and needs no further explanation other than to say that it is located within the hull of the boat in which the engine is installed, that it is fed with "raw" water from the boat's jet propulsion system, and that it is so mounted that when the boat is taken out of the water the "raw" water drains through a permanent bleed pipe in the bottom of the hull.

In operation, during engine warm-up, the two cooling systems work substantially independent of each other as follows:

In the thermostatically controlled engine block circuit, water, charged with antifreeze, is fed by pump 8 into the engine block 4 and from there to the cylinder head 6. From there it passes via pipe 16 to the exhaust manifold water jacket 10, and through pipe 18 to thermostat valve 12. Whilst the water temperature is below that necessary to open the thermostat valve, the water passes through outlet 20 into pipe 22 to the engine oil cooler 14 and thence through pipe 29 to the pump 8 to complete the circuit.

At the same time, in the lower temperature circuit, water also charged with antifreeze is fed by pump 30 through pipe 38 to the gearbox oil cooler 32, and then through pipe 40 to the charge air cooler 34. The water then passes via pipe 42 and branch pipe 44 to pipe 26 and thence through the heat exchanger 28 and pipe 36 to the pump 30 to complete its circuit.

When the water in the engine block circuit reaches operating temperature, thermostat valve 12 partly opens and causes the engine block circuit to be put partly in series with the lower temperature charge air cooler circuit. A part of the return flow from the engine by pipe 18 is directed by pipes 24 and 26 to the heat exchanger 28, while the remainder flows to the oil cooler 14 and engine block as before. The flow from charge air cooler 34 passes via pipe 44 to the heat exchanger 28, also as before, while the rest flows to pipe 22 to make up the water lost from the engine block circuit by the flow through pipe 24. The make up water dilutes and cools the hotter water returned from the engine through pipe 18.

Because the coolant from the remote heat exchanger 28 passes through charge air cooler 34 before the engine block 4, the former operates at a lower temperature than the latter. The size of heat exchanger 28 and thermostat valve 12 are so selected that they operate in the manner required to maintain the correct dfference in temperatures between the two coolant circuits and the thermostat valve remains in its partly open condition during normal running of the engine.

This dual circuit system necessitates the use of only one heat exchanger, which arrangement is less complex and therefore less costly to manufacture, install and maintain.

I claim:

1. A cooling system for a diesel engine havng charge air cooling, said system comprising:
   - a first cooling circuit including the cylinder block of said engine;
   - a second cooling circuit including a charge air cooler;
   - each said circuit employing a common liquid coolant;
   - a single heat exchanger for cooling liquid coolant passed therethrough;
   - means for connecting said first circuit, said second circuit and said heat exchanger in series, with said second circuit downstream of said heat exchanger and upstream of said first circuit, said connecting means being temperature controlled in such manner that the two circuits operate independently until the temperature of the coolant in the first circuit reaches a given value; and
   - the connecting means including a temperature-responsive valve in the first circuit, which valve has an inlet and a first outlet connected the first circuit and a second outlet connected to the inlet of the heat exchanger and is arranged to deliver at least a part of the coolant of the first circuit to the heat exchanger when the given temperature is reached, the flow of the liquid coolant in the second circuit not passing through the temperature responsive valve, and the temperature responsive valve being the only liquid coolant control valve positioned in the system for controlling flow between the first and second circuits 2. A cooling system according to claim 1, in which the second circuit as a return passage connected to both the heat exchanger and the first circuit.

* * * * *